United States Patent [19]

Shaner

[11] Patent Number: 5,171,946

[45] Date of Patent: Dec. 15, 1992

[54] SWITCH FOR DETECTING ABNORMAL ROTATIONAL MOVEMENT OF A BEARING MOUNTED SHAFT

[76] Inventor: Jeff Shaner, 709 E. Yucca, Hobbs, N. Mex. 88204

[21] Appl. No.: 637,140

[22] Filed: Jan. 3, 1991

[51] Int. Cl.⁵ ............................................. H01H 3/16
[52] U.S. Cl. ................................. 200/61.4; 200/61.41
[58] Field of Search .................. 200/52 R, 6 A, 61.39, 200/61.4–61.42; 340/682

[56] References Cited

U.S. PATENT DOCUMENTS

| | | | |
|---|---|---|---|
| 449,411 | 3/1891 | Hannah | 200/61.4 |
| 893,865 | 7/1908 | Ormiston et al. | 200/61.4 |
| 3,108,264 | 7/1957 | Heinoo | 340/682 |
| 3,325,611 | 3/1966 | Gourley et al. | 200/61.39 |
| 3,508,241 | 4/1970 | Potter | 340/682 |
| 3,513,375 | 5/1970 | Sellars | 318/460 |
| 3,676,723 | 7/1972 | Drucker | 310/68 B |
| 3,783,210 | 1/1974 | Spooner | 200/61.4 |
| 3,853,097 | 12/1974 | Aldag | 123/266 |
| 3,897,116 | 7/1975 | Carpenter | 384/297 |
| 3,965,315 | 6/1976 | Wuenn | 200/6 A |
| 4,214,179 | 7/1980 | Jacobson et al. | 310/68 B |
| 4,320,431 | 3/1982 | Bell | 361/23 |
| 4,584,865 | 4/1986 | Hutchins | 73/7 |
| 4,749,826 | 6/1988 | Saito | 200/6 A |
| 4,926,011 | 5/1990 | Saito | 200/6 A |

Primary Examiner—J. R. Scott
Attorney, Agent, or Firm—Burns, Doane, Swecker & Mathis

[57] ABSTRACT

A detecting device is disclosed for detecting undesired movement of a shaft such as a wrist pin relative to a bearing such as a wrist pin bearing. The detecting device includes a housing a rod pivotally mounted to the housing, and at least one detecting switch mounted on the housing adjacent the rod. A pointed end portion of the rod engages the shaft. The rod pivots when a point on the longitudinal axis of the shaft moves from a central axis of the bearing. As a consequence, a portion of the rod located adjacent to the detecting switch is pivoted from its normally centered position to an off-center position and actuates the detecting switch.

19 Claims, 4 Drawing Sheets

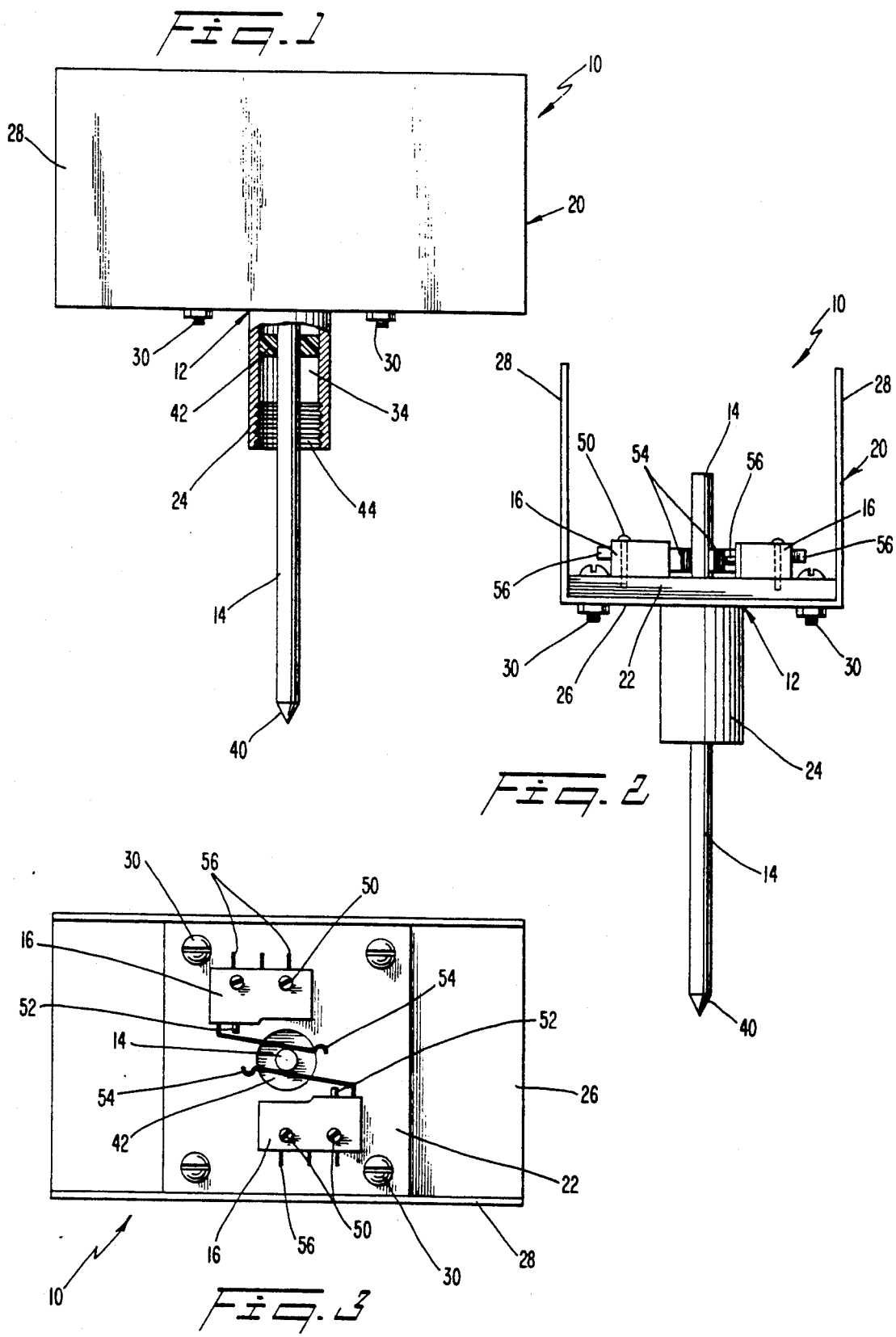

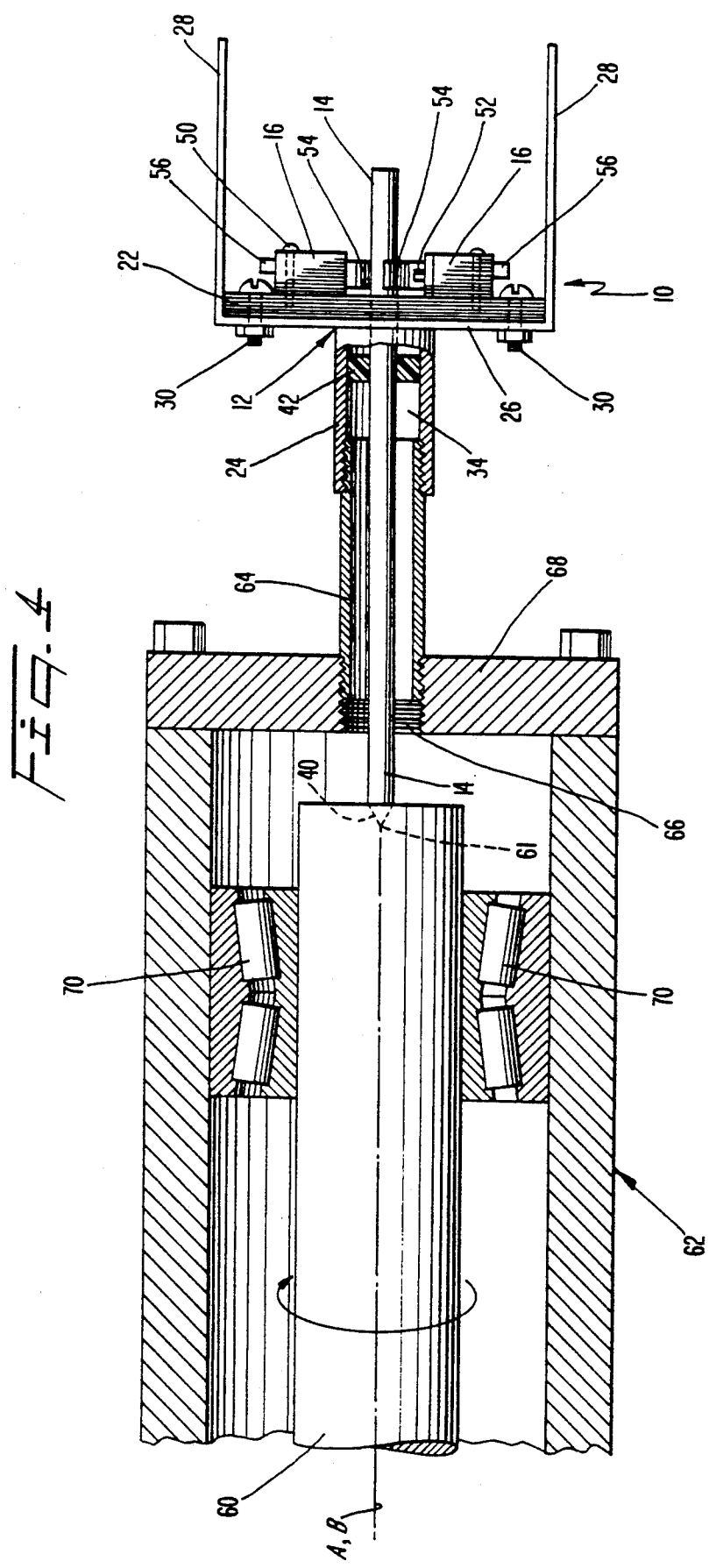

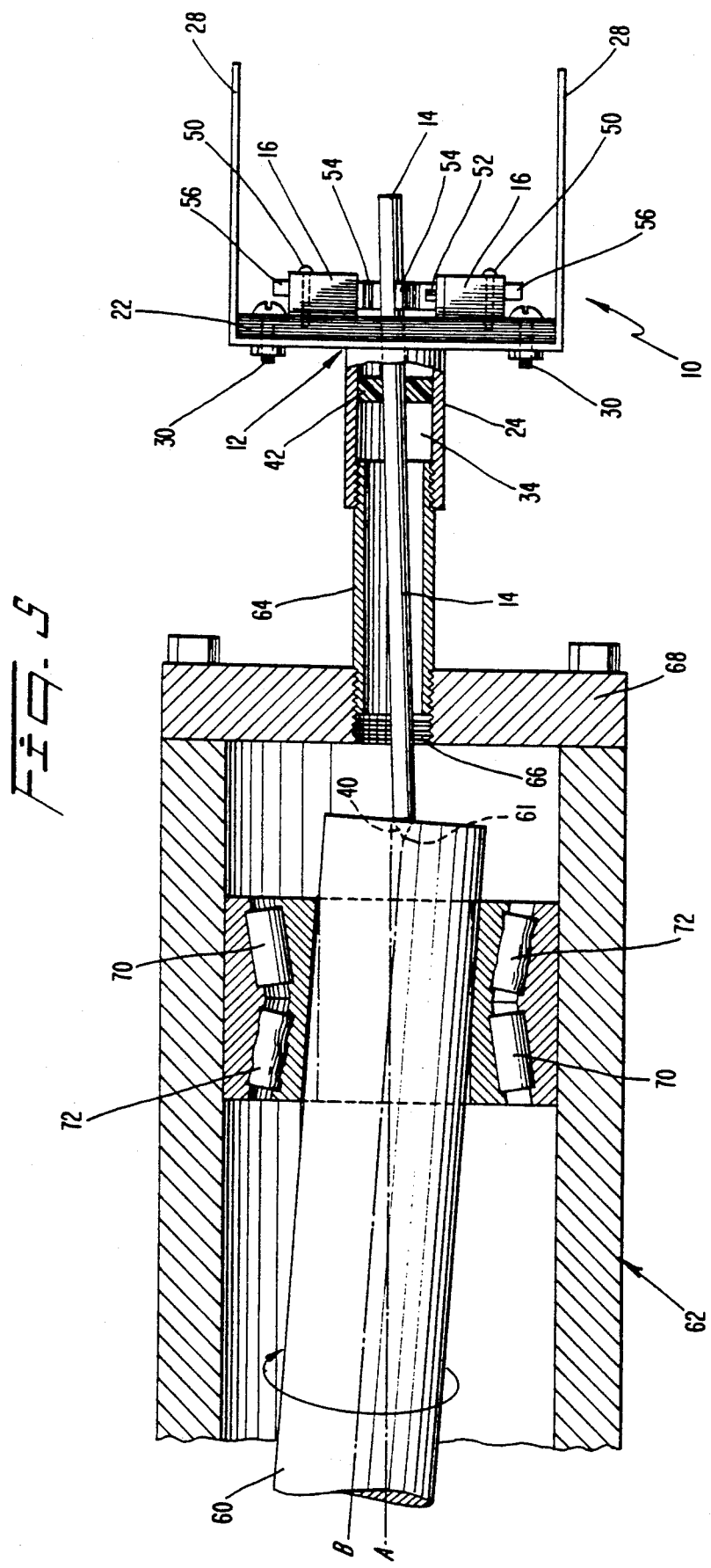

SWITCH FOR DETECTING ABNORMAL ROTATIONAL MOVEMENT OF A BEARING MOUNTED SHAFT

FIELD OF THE INVENTION

The present invention relates to devices useful for detecting undesired movement of objects relative to bearings. More particularly, the present invention relates to detecting devices for detecting undesired movement of a shaft relative to a bearing, e.g., a wrist pin relative to a wrist pin bearing.

BACKGROUND AND SUMMARY OF THE INVENTION

Several types of devices which are adapted to detect undesired movement of rotating objects or to detect bearing wear are known in the prior art. For example, U.S. Pat. No. 3,513,375 granted to Sellars discloses a safety stopping device which acts to close an electric circuit and thereby ground a motor to stop the motor, when the device detects eccentric shaft motion. When a shaft of the Sellars patent rotates eccentrically, it contacts and moves a sensor contact element, which allows a dog to disengage from the sensor contact element and trip a leaf spring, which urges the contact element into electrical contact with the shaft to ground the motor. The device of the Sellars patent has the disadvantage, however, that it is relatively complicated and thus may be relatively difficult and expensive to manufacture and repair.

U.S. Pat. No. 3,897,116 granted to Carpenter discloses a bearing wear detector which includes a pin which has an electrically-insulating coating thereon and which is mounted with one end inside a rotatable shaft. The rotatable shaft carries a metallic disc therein which rotates with the shaft in close non-contacting relationship with the pin, and, when the shaft rotates off-line due to bearing wear, the disc wears through the coating to make electrical contact with the pin and thereby complete a circuit which sets off an alarm system. The Carpenter device has the disadvantage, among others, that the coating on the pin is worn through each time the shaft rotates off-line, and thus the pin must be removed and replaced each time after the alarm system is activated. The Carpenter device is thus relatively costly and time-consuming to maintain on a continuous basis.

U.S. Pat. No. 893,865 granted to Ormiston et al. discloses a telltale apparatus which includes a pair of ebonite castings located below a shaft which are movable relative to each other and which are spring biased apart, and pairs of hollow contact points located on each of the ebonite castings, respectively. When bearings holding the shaft wear down to a certain point, the shaft will rest on the upper one of the ebonite castings, and will force it downward so that the pairs of contact points will meet and thereby close a circuit to ring an alarm bell. A disadvantage of the Ormiston et al. device is that a relatively large amount of bearing wear is needed before the circuit in the Ormiston et al. device will close, and the Ormiston et al. device is thus relatively undesirable for use in detecting small amounts of undesired eccentric rotation of a shaft which may be caused by bearing wear. Also, since the Ormiston et al. device is located within the shaft's housing, the device is difficult to install, and, once the device is installed, it is difficult to adjust the level of bearing wear which the device will detect.

In view of the above, it is an object of the present invention to provide an improved detecting device which is readily capable of detecting undesired movement of a shaft relative to a bearing.

A further object of the present invention is to provide a detecting device which is effective to detect relatively small amounts of undesired movement of a shaft relative to a bearing.

A still further object of the present invention is to provide a detecting device which operates to greatly reduce the need for costly repairs to an apparatus which includes a rotating shaft.

Yet another object of the present invention is to provide a detecting device which is relatively inexpensive and simple to maintain on a continuous basis.

Another of the objects of the present invention is to provide a detecting device which includes a redundancy of detecting switches so that the device will still operate effectively even if one detecting switch fails.

It is a further object of the present invention to provide a detecting device which is relatively easy and inexpensive to manufacture and repair when needed.

Additionally, it is a further object of the present invention to provide a detecting device which needs repair relatively rarely.

The present invention also has the object to provide a detecting device which may be installed easily on a rotatable shaft.

It is a further object of the present invention to provide a detecting device which can operate an alarm, a recording device, and/or a power disconnection circuit.

Another object of the present invention is to provide a detecting device in which the amount of undesired movement which will be detected is readily adjustable.

The above objects, as well as other objects not specifically enumerated, are accomplished by a detecting device for detecting undesired movement of a shaft relative to a bearing in accordance with the present invention. The detecting device for detecting undesired movement of a shaft relative to a bearing in accordance with the present invention includes housing means for the shaft and bearing, detecting means, switch means, and mounting means for mounting the detecting means to the housing means such that the detecting means contacts the shaft and pivots when a point on a longitudinal axis of the shaft moves off of a central axis of the bearing, wherein the pivoting of the detecting means actuates the switch means so that the undesired movement of the shaft relative to the bearing is detected.

The objects of the present invention are also accomplished by a detecting device for detecting undesired movement of a shaft relative to a bearing, which includes a housing, a rod pivotally mounted to the housing, wherein the rod has a first end thereof for contacting the shaft, and at least one detecting switch mounted on the housing adjacent the rod, wherein the rod is pivotable when a point on a longitudinal axis of the shaft moves from a central axis of the bearing, and wherein the pivoting of the rod actuates the detecting switch.

The objects of the present invention are further accomplished by a detecting device for detecting undesired movement of a shaft relative to a bearing, which includes a housing, a rod having a first end pivotally attached to the shaft and having a second end, wherein the rod is pivotally attached within the housing intermediate the first and second ends, and a pair of switches located a distance from the first end of the rod such that the pivotal attachment is intermediate the first end and the switches, wherein the rod pivots within the housing when a point on the longitudinal axis of the shaft moves from a central axis of the bearing, and wherein the rod closes at least one of the switches during the pivoting so that the undesired movement of the shaft relative to the bearing is detected.

BRIEF DESCRIPTION OF THE DRAWINGS

The preferred embodiments of the present invention will be described in greater detail with reference to the accompanying drawings, wherein like members bear like reference numerals and wherein:

FIG. 1 is a partial sectional top view of a detecting device of the present invention;

FIG. 2 is a side view of the detecting device of FIG. 1;

FIG. 3 is a back view of the detecting device of FIG. 1;

FIG. 4 is a partial sectional side view of a wrist pin and wrist pin bearing housing with the detecting device of FIG. 1 mounted thereto; and FIG. 5 is a view similar to FIG. 4 in which a wrist pin bearing has begun to fail;

DETAILED DESCRIPTION OF THE PREFERRED EMBODIMENT

Figure 6:
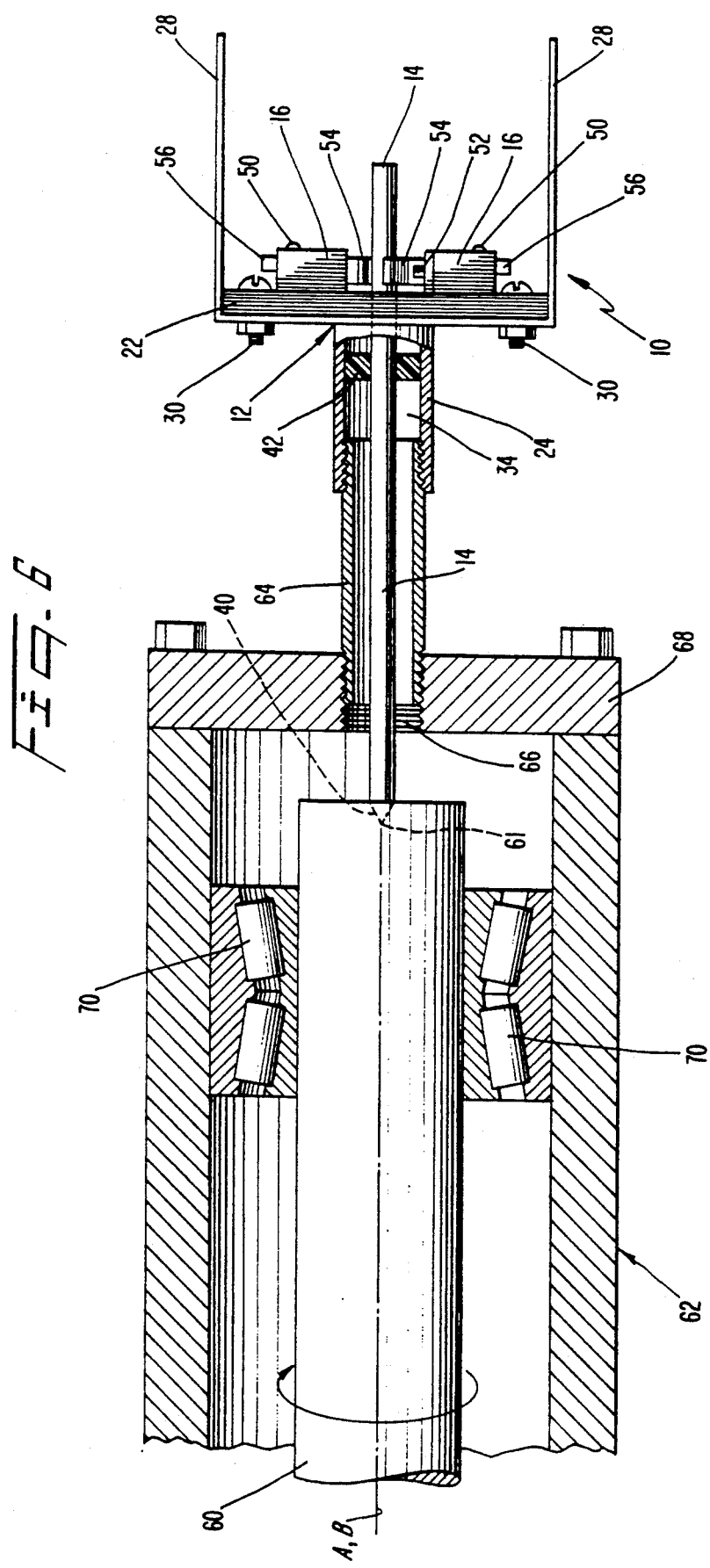
FIG. 6 is a view similar to FIG. 4, with a second embodiment of the detecting device of the present invention mounted to a wrist pin and a wrist pin bearing housing.

With reference to FIGS. 1-3, a detecting device 10 in accordance with a first embodiment of the present invention includes a housing 12, a rod 14 extending through the housing 12, and a pair of switches 16 mounted on the housing 12. FIGS. 1-3 show the device 10 oriented such that the rod 14 extends vertically in FIGS. 1 and 2. However, in normal use the device 10 is oriented such that the rod 14 extends horizontally, as shown in FIGS. 4 and 5.

The housing 12 includes a U-shaped bracket 20 and a plate 22 having a hollow cylindrical extension 24 extending downwardly in FIG. 1 therefrom. The U-shaped bracket 20 is made of relatively thin material such an sheet metal, and it includes a base 26 which has a central hole therethrough and two sides 28 which extend upwardly in FIG. 2 from the base 26. The plate 22 is made of thicker material than the U-shaped bracket 20. It is secured to the base 26 of the U-shaped bracket 20 by four bolts 30 which extend through mounting holes in the plate 22 and the base 26, and the hollow cylindrical extension 24 thus extends downwardly in FIG. 1 through the central hole in the base 26. The plate 22 also has a central hole 32 extending therethrough, and, since the hollow cylindrical extension 24 extends downwardly in FIG. 1 from a lower edge of the central hole 32, the extension 24 and the hole 32 together form a central passageway 34 through the housing 12.

As can best be seen from FIGS. 1 and 2, the rod 14 is elongated and cylindrical, includes a pointed portion 40 at a first end thereof, and has a second end opposite the first end. The rod 14 extends within the housing 12 through the central passageway 34 such that the pointed portion 40 at the rod's first end extends downwardly in FIG. 1 from the extension 24, and such that the second end of the rod 14 extends upwardly in FIG. 1 from the plate 22 between the sides 28 of the U-shaped bracket 20. The rod 14 is pivotally attached to the housing 12 by a rubber seal ring 42 which is fixed inside the extension 24 and which is frictionally attached around the rod 14 intermediate the rod's first and second ends so that the rod 14 is free to pivot within the housing 12. Alternatively, the seal ring may be cast out of rubber as one piece with the extension 24. As can be seen from FIG. 1, the extension 24 includes internal threads 44 for mounting of the device 10, as will be explained further hereinbelow.

The switches 16 are preferably cast in plastic to protect the switches, and are mounted to the upper side (with reference to FIG. 2) of the plate 22 by bolts 50, so that they are located adjacent the rod 14 a distance from the first end of the rod 14. Alternatively, the switches 16 may be welded to the plate 22 or secured thereto in another manner. As can best be seen from FIG. 3, each switch 16 is a mechanical contact switch which includes a first terminal 52, a switch member 54 made of spring metal, and a set of second terminals 56. The switch member 54 is normally biased away from the first terminal 52 toward the rod 14, and contact between the switch member 54 and the first terminal 52 closes the switch so that current flows therethrough. Alternatively, the switch member 54 may be normally closed by the rod 14, with movement of the rod 14 away from the switch member 54 opening the switch. The second terminals 56 preferably connect each switch 16 to an electrical power disconnection circuit (not shown), as will be described hereinbelow. It can be appreciated from FIGS. 1-3 that the sides 28 of the U-shaped bracket 20 partially surround and protect the switches 16 and the second end of the rod 14. This feature contributes to the overall sturdiness and resistance to damage of the detecting device 10.

With reference to FIG. 4, the detecting device 10 is mounted such that the pointed portion 40 of the rod 14 contacts a shaft such as a wrist pin 60 and a bearing housing such as a wrist pin bearing housing 62, as described hereinbelow. The wrist pin 60 extends horizontally as shown in FIG. 4, and is rigidly attached to a pair of vertically-extending crank arms (not shown) which are rigidly attached to a horizontally-extending central shaft connected to the shaft of a motor (not shown), thereby providing a known crankshaft/wristpin arrangement. The central shaft, the crank arms, and the wrist pin 60 all rotate rigidly about a central axis of the jack shaft, so that the wrist pin 60 rotates in a large circle about an axis which is parallel to a longitudinal axis B of the wrist pin 60. The wrist pin bearing housing 62 is rotationally connected to a pitman arm or similar (not shown) which is constrained to move only reciprocally, and the wrist pin bearing housing 62 is rotationally connected to the wrist pin 60 by a wrist pin bearing 70.

As the wrist pin 60 rotates about the jack shaft central axis, the wrist pin bearing housing 62 and the wrist pin bearing 70 move with it, but, since they are connected to the pitman arm, they also rotate relative to the wrist pin 60 as the wrist pin bearing housing 70 forces the pitman arm to move reciprocally. Accordingly, large transverse forces are applied between the wrist pin 60 and the wrist pin bearing 70, in addition to the rotational forces which normally occur between shafts and bearings. Thus, breakdown of wrist pin bearings in the field can occur quite frequently, and quick detection of such breakdown is essential.

To mount the detecting device 10 on the wrist pin bearing housing 70, a second hollow cylindrical extension 64 of the housing 12 is preferably threaded into the first extension 24 by engagement of the internal threads 44 of the first extension 24 with external threads on a first end of the second extension 64. The second extension 64 also includes external threads on a second end thereof, and thus the second extension 64 is also threaded into a threaded hole 66 (either existing or provided for receiving the detecting device 10) in an end plate 68 of the wrist pin bearing housing 62. When mounted, the rod 14 extends through the second extension 64, through the hole 66 in the end plate 68, and into the housing 62. The housing 62 is packed with grease to help maintain a smooth rotation of the wrist pin 60 in the wrist pin bearing 70, and the second extension 64, the first extension 24, and the rubber seal ring 42 together act to seal the hole 66 in the housing 68 against leakage of the grease.

The housing 62 is supported on the wrist pin bearing 70, and the wrist pin bearing 70 is supported on the wrist pin 60 such that the wrist pin 60 normally is centered in the housing 62 on a central axis A of the wrist pin bearing 70, which normally coincides with a longitudinal axis B of the wrist pin 60. As can be seen from FIG. 4, the pointed portion 40 of the rod 14 extends into the wrist pin bearing housing 62, and pivotally attaches to the wrist pin 60 by contacting the wrist pin 60 at a point 61 which is on the longitudinal axis B of the wrist pin 60. In such a position, the rod 14 extends along and is centered on the central axis A of the wrist pin bearing 70 and the longitudinal axis B of the wrist pin 60.

With reference to FIGS. 1-5, the structure and operation of the detecting device 10 will now be explained. As shown in FIG. 4, the detecting device 10 is mounted such that the housing 12 is mounted to the wrist pin bearing housing 62 and such that the pointed portion 40 of the rod 14 contacts the wrist pin 60 at the point 61 which is on the longitudinal axis B of the wrist pin 60. Normally, the wrist pin 60 is located in the wrist pin bearing 70 on the central axis A of the wrist pin bearing 70, the rod 14 remains substantially stationary relative to the housing 12 as the wrist pin 60 and the wrist pin bearing 70 rotate relative to each other, and the switch members 54 remain spaced from the first terminals 52 so that the switches 16 are maintained in open positions (or the switches 16 may be maintained in closed positions, as noted above, if desired).

If, however, the wrist pin bearing 70 begins to fail, as depicted in FIG. 5 by reference numeral 72, the wrist pin bearing housing 62 will begin to vibrate out of line or skew a slight amount such that the longitudinal axis B of the wrist pin 60 no longer coincides with the central axis A of the wrist pin bearing 70, as is shown in FIG. 5. Accordingly, the point 61 on the longitudinal axis B, and thus the first end of the rod 14, will no longer be on the central axis A, which causes the rod 14 to pivot within the housing 12 about the portion of the rod 14 frictionally held by the rubber seal ring 42. The second end of the rod 14 thus will also no longer be on the central axis A, and will contact one or both of the pair of switch members 54, thereby moving the respective switch member 54 against its own bias force into electrical contact with its respective first terminal 52 (or thereby opening a switch, as noted above). The presence of two switches provides a redundancy of control in the event one switch fails. As is seen in FIGS. 4 and 5, the distance along the rod 14 between the switches 16 and the seal ring 42 is much smaller than the distance along the rod 14 between the seal ring 4 and the point 61. The mechanical force applied to the rod 14 by the wrist pin 60 as it moves off line is therefore multiplied by the rod 14 at the point where it contacts the switch members 54, to ensure that the bias of the switch members 54 is fully overcome.

A switch 16 is thus closed by the movement of the second end of the rod 14, and, since the switch 16 is preferably connected to a power disconnection circuit (not shown), the power to the prime mover which drives the wrist pin 60 is automatically disconnected. Thus, the undesired movement of the wrist pin 60 is quickly detected by the device 10, and the power driving the wrist pin 60 is automatically shut off before failure of the wrist pin bearing 70 causes serious damage to the wrist pin 60, the wrist pin bearing housing 62, or other parts which are drivingly connected to the wrist pin 60 and the wrist pin bearing housing 62.

As can be appreciated from FIGS. 1-5, the detecting device 10 in accordance with the present invention presents many advantages. Because the detecting device is of relatively simple design and contains relatively few parts, it is simple and inexpensive to manufacture and repair when needed. Also, the device is relatively sturdy and thus needs repair only relatively rarely.

The device is also exceedingly easy to install on a bearing housing. As can be seen from FIG. 4, an installer need only tap a small hole in the center of a bearing housing end plate (if one is not already present), locate the pointed portion 40 of the rod 14 in contact with the center hole in the wrist pin 60, and screw the second extension 64 into the tapped hole. As the second extension is turned, the installer just holds the pointed portion 40 of the rod 14 in the center hole in the rotatable pin, and the seal ring 42 is pulled slowly down the length of the rod 14 until the second extension is tightly screwed into the tapped hole.

Additionally, the device is designed such that the amount of undesired movement by a shaft relative to a bearing housing which will be enough to be detected by the device can be easily adjusted. Since the switches 16 are mounted in a location exterior of the wrist pin bearing housing 62, it is easy to get to the switches 16, and their exact location can thus easily be adjusted after the indicating device 10 has been mounted. Also, the ease of adjustment of the switches 16 may be increased if the switches 16 are mounted, e.g., on a sliding mounting (not shown), so that the switches 16 can be displaced toward and/or away from the rod 14. A suitable arrangement for fastening the switches 16 at an adjusted position can be provided. Adjustment of the switches 16 allows a user to quickly and easily set the device at any of a wide range of movement sensitivities. This adjustment feature allows the user to detect very small amounts of undesired movement of a shaft relative to a bearing housing and to readily adjust the device for different diameter wristpins.

A detecting device 10' in accordance with a second embodiment of the present invention is shown in FIG. 6 in a mounted position. The detecting device 10' functions in the same manner as the detecting device 10. However, the switches 16' of the detecting device 10' are magnetic switches, preferably encased in plastic, not contact switches. The detecting device 10' includes all of the advantages of the detecting device 10, with the additional advantage that the magnetic switches 16' are less likely to become worn or clogged with foreign material than are the switches 16.

It is to be understood that various modifications may be made to the detecting device of the present invention while retaining at least some of the advantages of the present invention. For example, a box and cover arrangement may be substituted for the U-shaped bracket, and advantages obtained therefrom. Different materials such as plastics may be advantageously used for the seal ring instead of rubber. The switches may be connected to circuits other than a power disconnection circuit, i.e., an alarm circuit or a recording circuit, and advantages obtained therefrom. Also, it is to be understood that although the device is shown in the drawings as being for use with a wrist pin and wrist pin bearing housing, the device may be used advantageously with almost any shaft mounted in a bearing.

The number of switches surrounding the rod may be varied, i.e., from one to at least four, and advantageous detection still obtained. The switches may also be arranged such that they are normally held closed by the rod, and such that movement of the rod away from a switch causes the switch to open and disconnect the power. Also, different types of switches may be advantageously used.

The principles, preferred embodiments, and mode of operation of the present invention have been described in the foregoing specification. However, the invention which is intended to be protected is not to be construed as limited to the particular embodiment disclosed. The embodiment is therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

I claim:

1. A detecting device for detecting undesired movement of a shaft arranged in a bearing for rotational movement, comprising:
   housing means for the shaft and bearing;
   detecting means;
   switch means; and
   mounting means for slidably mounting said detecting means to said housing means such that said detecting means slides into contact with an end face of the shaft and pivots when a point on a longitudinal axis of the shaft moves off of a central axis of the bearing, said pivoting of the detecting means actuating said switch means so that the undesired movement of the shaft relative to the bearing is detected.

2. A detecting device as claimed in claim 1, wherein said detecting means includes an elongated rod.

3. A detecting device as claimed in claim 1, wherein said switch means includes at least one contact switch which is closed by said pivoting of said detecting means.

4. A detecting device as claimed in claim 1, wherein said mounting means includes a housing, a first pivotal attachment between said detecting means and said housing, and a second pivotal attachment between said detecting means and the shaft.

5. A detecting device as claimed in claim 4, wherein said detecting means includes an elongated rod, and wherein said first pivotal attachment includes a rubber seal ring which extends around said rod intermediate ends of said rod and which is fixed within said housing.

6. A detecting device as claimed in claim 4, wherein said detecting means includes an elongated rod, and wherein said second pivotal attachment includes a pointed portion on a first end of said rod for contacting the shaft at the point on the longitudinal axis of the shaft.

7. A detecting device as claimed in claim 1, wherein said detecting means includes an elongated rod having a first end contacting the shaft and a second end opposite said first end, and wherein said switch means includes at least one contact switch located at a distance from said first end.

8. A detecting device as claimed in claim 7, wherein said mounting means includes a housing, and a first pivotal attachment between said housing and said rod intermediate said first and second ends, said rod pivoting within said housing in response to the movement of the point on the longitudinal axis of the shaft, and said rod closing said contact switch during said pivoting so that the undesired movement of the shaft relative to the bearing is detected.

9. A detecting device as claimed in claim 1, wherein said mounting means includes a housing, said detecting means extending within said housing and being pivotally attached to said housing, and said switch means being mounted on said housing.

10. A detecting device as claimed in claim 1, wherein said detecting means remains substantially stationary relative to said mounting means as long as the longitudinal axis of the rotating shaft remains on the central axis of the bearing.

11. A detecting device as claimed in claim 1, wherein said switch means includes at least one magnetic switch.

12. A detecting device as claimed in claim 1, wherein an end of the detecting means is received in a recess in the shaft.

13. A detecting device for detecting undesired movement of a shaft arranged in a bearing for rotational movement, comprising:
   a housing;
   a rod pivotally and slidably mounted to said housing, said rod having a first end thereof for sliding into contact with an end face of the shaft; and
   at least one detecting switch mounted on said housing adjacent said rod, said rod being pivotable when a point on a longitudinal axis of the shaft moves from a central axis of the bearing, said pivoting of said rod actuating said detecting switch.

14. A detecting device as claimed in claim 13, further comprising:
   a rubber seal ring fixed within said housing and extending around said rod, said ring pivotally mounting said rod within said housing.

15. A detecting device as claimed in claim 14, wherein said at least one detecting switch is located a distance from said first end of said rod, and wherein said ring extends around said rod intermediate said first end and said at least one detecting switch.

16. A detecting device as claimed in claim 13, wherein said first end of said rod includes a pointed portion, said pointed portion for contacting the shaft at the point on the longitudinal axis of the shaft to form a pivotal attachment between the shaft and said rod.

17. A detecting device as claimed in claim 13, wherein said at least one detecting switch is a contact switch, said contact switch closing in response to contact with said rod.

18. A detecting device as claimed in claim 13, wherein said at least one detecting switch is a magnetic switch.

19. A detecting device for detecting undesired movement of a shaft arranged in a bearing for rotational movement, comprising:

a housing;

a rod having a first end pivotally attached to the shaft and having a second end, said rod being slidably attached within said housing intermediate said first and second ends so that said first end slides into contact with an end face of the shaft; and a pair of switches located a distance from said first end of said rod such that said pivotal attachment is intermediate said first end and said switches, said rod pivoting within said housing when a point on the longitudinal axis of the shaft moves from a central axis of the bearing, and said rod closing at least one of said switches during said pivoting so that the undesired movement of the shaft relative to the bearing is detected.

* * * * *